Patented May 22, 1951

2,554,454

UNITED STATES PATENT OFFICE 2,554,454

PROCESS FOR LAMINATING PAPER

George S. Casebolt, Darien, Conn., assignor to American Cyanamid Company, New York, N. Y., a corporation of Maine No Drawing. Application June 22, 1946, Serial No. 678,670

2 Claims. (Cl. 154—138)

This invention relates to adhesives and a process for using the same. More particularly, the invention is directed to adhesives comprising a melamine resin and starch, and a process for cold curing these adhesives under humid conditions.

In order to obtain or achieve maximum machine speed in producing laminated articles such as paper board, it is necessary to employ a paste having good tack. Cooked starch paste develops its best known tack at an alkaline pH. Accordingly, to obtain optimum results with this material in a waterproof adhesive mix, the waterproofing agent should cure in an alkaline medium. It has been found, and is included as a part of this invention, that melamine formaldehyde resins blend with starch to form an adhesive mix which is cold setting and waterproof.

Since there are many variables which could possibly influence the properties of the products obtained, investigation was carried out to determine operable ranges and optimum conditions with respect to many of the variables that might have a greater influence on the product obtained. Some of these factors were the pH at which the starch was cooked, and whether or not the resin was added before or after the starch was cooked; the ratio of resin to starch paste; the pH at which the paste was spread, and compounds used for this pH adjustment; the amount or weight of paste spread or applied; the cure conditions such as relative humidity, temperature, and time.

It was found, by experimentation, that the starch should be cooked at an alkaline pH below 8.6 with the resin added after the starch is cooked, and at an alkaline pH below 8.2, with the resin added before the starch was cooked.

The starch solution found to be suitable for this use contained approximately 38% starch. Satisfactory results have been obtained with the ratio of melamine resin to starch varying between 1:5, and 1:20 parts by weight.

The proper pH of the adhesive when spread depends upon the alkaline material employed in adjusting the pH. For example, when the pH is adjusted with sodium carbonate, satisfactory products were obtained with an alkaline pH up to 9.1; and when adjusted with sodium hydroxide, satisfactory results were obtained with an alkaline pH up to 9.4, but with this material the adhesive had to be cured at a relative humidity of substantially 100%. To obtain satisfactory results, the adhesive should be spread in an amount between 12 and 25 pounds per 1000 square feet per glue line, and the spread should not be decreased below 10 pounds per 1000 square feet per glue line.

The conditions of cure depend primarily upon the pH, particularly the spread pH. At a spread pH of 9.0, the relative humidity must be above 70% and preferably above 95%, and when the spread pH is 7.3, the relative humidity must be above 95% and preferably at substantially 100%. The temperature at which the cure may be satisfactorily effected, may vary between 29° and 40° C. Within this range of temperature the time of the cure varies directly with the spread pH. For example, at a spread pH of 9.0, 8 to 13 days were required to cure the adhesive, whereas at a spread pH of 7.9, 4 to 7 days were all that was required to properly cure the adhesive.

Although a combination of the individual optimum conditions does not produce a substantially superior board, the optimum conditions were found to be to cook the starch at a pH of 7.7 with the resin added after the starch was cooked. The optimum ratio of melamine resin to starch was found to be 1 to 5. The pH was adjusted with sodium carbonate to effect a spread pH of 7.7 to give optimum spread pH. The adhesive spread that gave the optimum results was 20 pounds per 1,000 square feet per glue line. The optimum cure conditions were found to be substantially 100% relative humidity, 40° C. temperature, and 11 days cure period.

In selecting the melamine resin, satisfactory resins were prepared by reacting 1 mol of melamine with 1 to 4 mols of formaldehyde. Optimum results were obtained, however, when the molar ratio of formaldehyde to melamine varied between 2 and 3 mols of formaldehyde per mol of melamine.

The following example illustrates one method of making and using the waterproof adhesive with the resin added after the starch is cooked; 2½ lbs. of starch (Stein-Hall) and 4 pounds of water were heated to 90° C. in 10 minutes. Thereafter the paste was cooled to 60° C. in 10 minutes, and 0.5 pound of melamine formaldehyde resin was added. The pH of the adhesive was adjusted with sodium hydroxide to 8.9 (glass electrode at 25° C.). The adhesive was cooled to 35° C. and applied as an adhesive in the following manner: a 5 ply southern kraft paperboard panel was prepared by applying the paste in an amount of approximately 20 pounds per 1000 square feet per glue line, by coating both sides of the No. 2 and No. 4 sheets. The panels were assembled immediately, and pressed through cold pressure rolls. The panels were then cured for 8 days at 30° C. in an environment having a relative humidity of 95%. Paperboard made according to this procedure was soaked for 24 hours in water at 25° C., after which time it could not be pulled apart at the glue lines.

The above procedure and conditions were varied to prepare other adhesives in determining the previously discussed limits of variable condition. Also, the ingredients were mixed and the starch cooked according to the procedure given above with the resin added prior to the cooking.

I claim:

1. A process of making water-proof paper laminate comprising coating paper sheets with a cooked starch melamine-formaldehyde resin paste, to a spread in excess of 10 pounds per thousand square feet per glue line, assembling and cold pressing the sheets together and curing the assembled laminate under controlled humid conditions in excess of 70% relative humidity, wherein the starch resin adhesive is prepared by blending starch, cooked at a pH below 8.6, and melamine-formaldehyde resin, in a weight ratio of 5:1 and 20:1 respectively, said paste having pH adjusted to 7.3-9.4.

2. A process of making water-proof paper laminate comprising coating paper sheets with a cooked starch melamine-formaldehyde resin paste, to a spread of 10-20 pounds per thousand square feet per glue line, assembling and cold pressing the sheets together and curing the assembled laminate under controlled humid conditions in excess of 70% relative humidity, wherein the starch resin adhesive is prepared by blending starch, cooked at a pH below 8.6 and melamine-formaldehyde resin, in a weight ratio of 5:1 and 20:1 respectively, said paste having a pH adjusted to 7.3-9.4.

GEORGE S. CASEBOLT.

REFERENCES CITED

The following references are of record in the file of this patent:

UNITED STATES PATENTS

| Number | Name | Date |
|---|---|---|
| 2,212,314 | Bauer et al. | Aug. 20, 1940 |
| 2,302,309 | Glarum et al. | Nov. 17, 1942 |
| 2,318,121 | Widmer et al. | May 4, 1943 |
| 2,408,065 | Hansen | Sept. 24, 1946 |

OTHER REFERENCES

"Starch Adhesives" by Lee T. Smith and R. M. Hamilton, published in Chemical and Engineering News, vol. 22, No. 17, September 10, 1944. Pages 1482-1496. (Special reference to 1483, col. 3, 2nd full paragraph.)